A. C. DICKHUTE.
PITMAN CONNECTION FOR HARVESTING MACHINES.
APPLICATION FILED DEC. 30, 1912.
1,062,444.    Patented May 20, 1913.
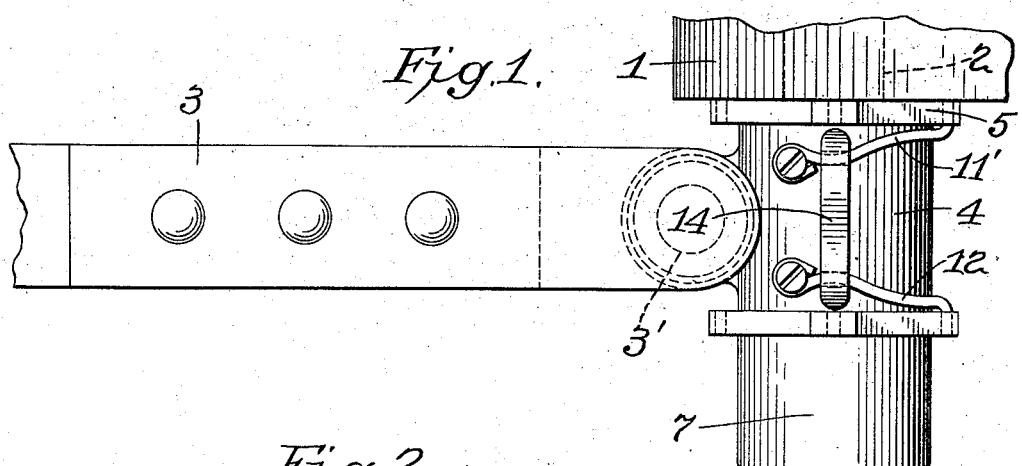
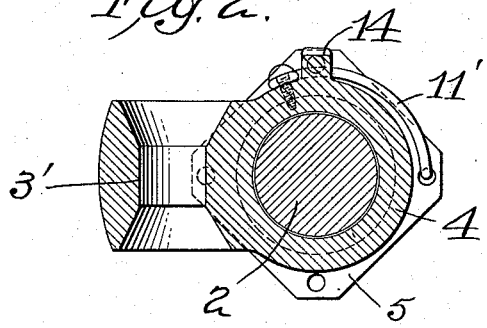
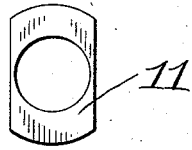
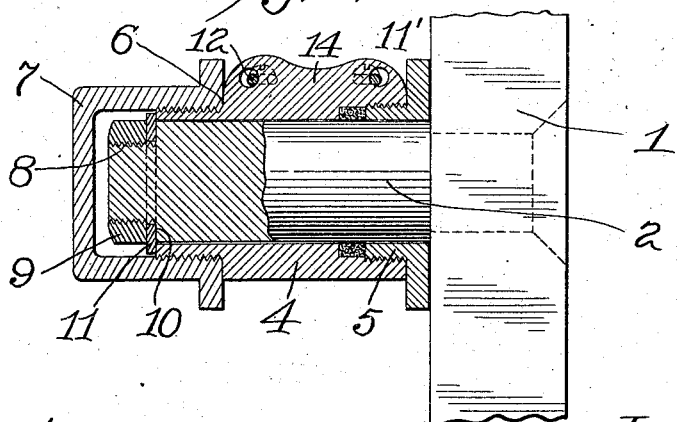
Attest:
Ewd L. Tolson,
Chas. F. Calhoun, Jr.
Inventor:
Albert C. Dickhute,
by Spear, Middleton, Donaldson & Spear
Attys.

UNITED STATES PATENT OFFICE.

ALBERT C. DICKHUTE, OF SHELBY, NEBRASKA.

PITMAN CONNECTION FOR HARVESTING-MACHINES.

1,062,444.   Specification of Letters Patent.   Patented May 20, 1913.

Application filed December 30, 1912. Serial No. 739,395.

*To all whom it may concern:*

Be it known that I, ALBERT C. DICKHUTE, a citizen of the United States, residing at Shelby, Nebraska, have invented certain new and useful Improvements in Pitman Connections for Harvesting-Machines, of which the following is a specification.

My invention relates to the connection between the pitman of a mowing machine and the crank pin on the crank disk, and the object is to provide a connection of simple form which will hold the lubricant securely and which may have its parts readily detached for supplying new lubricant, said parts, however, when attached in proper relation being held securely against accidental displacement.

In the drawings Figure 1 is a plan view of my connection, a portion of the pitman and a portion of the crank disk being illustrated. Fig. 2 is a longitudinal sectional view through my connection. Fig. 3 is a view of the parts assembled, shown partially in section. Fig. 4 is a detail view of the retaining washer.

In these drawings 1 indicates a portion of the crank disk, 2 is the crank pin and 3 a portion of the connecting rod or pitman. This connecting rod has journal pins engaging an eye 3' formed in one piece with the boxing 4, which is journaled on the crank pin. This boxing at one end is screw threaded internally to receive a gland 5 which is located between the end of the boxing and the face of the crank disk, the said gland having an opening through which the crank pin passes. The opening through the boxing is of a diameter to receive the crank pin freely but without lost motion. The other end of the boxing is externally screw threaded at its shoulder portion 6 and within a cap portion 7, said cap portion entirely inclosing the outer end of the crank pin and being of a size adapted to hold lubricant to keep the crank pin supplied therewith. The crank pin has a reduced screw threaded end 8 receiving a nut 9, between which and the shoulder 10 of the crank pin a washer 11 is clamped, this washer being of sufficient diameter to bear on the screw threaded reduced end of the boxing so as to retain the boxing on the crank pin and prevent edgewise displacement.

All of the parts just described are inclosed within the cap, before mentioned, which holds the lubricant. The lubricant from this cap can pass along the crank pin, and for this purpose I prefer to form the washer with flat sides, leaving exposed at these points the crevice between the crank pin and the interior of the boxing.

In order to hold the gland and the cap against turning, I provide spring members 11' and 12 secured by screws to the exterior of the boxing and extending thence circumferentially around the boxing part way, the ends of these springs being turned outwardly to engage any one of a series of openings formed in the flanges of the cap and gland. These springs, at points near the screws, extend through openings in a lug or rib 14 formed on the boxing. While these springs will securely hold the gland and cap against unscrewing, they enable an attendant to readily remove these parts, the springs being pressed back simply by pressure of the finger to enable the gland or cap to be unscrewed. They are in position, however, to resist any tendency of the parts to unscrew, this tendency being exerted, of course, in a direction at right angles to the direction in which the springs are adapted to bend.

I claim as my invention:

In combination with a crank pin having a threaded end, a boxing mounted thereon, a gland screw threaded into connection with the boxing therewith at one end, a cap for holding lubricant screw threaded into connection with the other end of the boxing, the said cap inclosing the threaded end of the crank pin, and spring locking members secured to the boxing, extending circumferentially part way about the same, the said gland and cap having a series of openings to receive the laterally bent ends of the said springs, substantially as described.

In testimony whereof, I affix my signature in presence of two witnesses.

ALBERT C. DICKHUTE.

Witnesses:
JAMES McGIMPSEY,
C. OSCAR OLSON.